(12) United States Patent
Nolan et al.

(10) Patent No.: US 7,047,868 B2
(45) Date of Patent: May 23, 2006

(54) PISTON AND CYLINDER ASSEMBLY WITH PUSH ROD RETENTION

(75) Inventors: Michael Joe Nolan, Plymouth, MI (US); Tim M. Dangel, Oxford, MI (US)

(73) Assignee: FTE Automotive USA Inc., Auburn Hills, MI (US)

( * ) Notice: Subject to any disclaimer, the term of this patent is extended or adjusted under 35 U.S.C. 154(b) by 99 days.

(21) Appl. No.: 10/769,224

(22) Filed: Jan. 30, 2004

(65) Prior Publication Data

US 2005/0166753 A1    Aug. 4, 2005

(51) Int. Cl.
*F16J 1/14* (2006.01)

(52) U.S. Cl. .................................................. 92/187
(58) Field of Classification Search ............... 92/187, 92/188; 60/533; 403/76, 90, 114, 122, 123, 403/125, 130
See application file for complete search history.

(56) References Cited

U.S. PATENT DOCUMENTS

| 3,107,111 | A |   | 10/1963 | Hagen |
| 3,173,266 | A | * | 3/1965  | Shutt ............................ 92/187 |
| 4,407,125 | A |   | 10/1983 | Parsons ........................ 60/584 |
| 4,590,765 | A |   | 5/1986  | Monstevens ................. 60/585 |
| 4,599,860 | A |   | 7/1986  | Parsons ........................ 60/584 |
| 4,650,363 | A | * | 3/1987  | Kehl et al. ................... 403/135 |
| 4,831,916 | A | * | 5/1989  | Leigh-Monstevens et al. ... 403/76 |
| 4,856,282 | A |   | 8/1989  | Monstevens et al. ......... 60/589 |
| 4,924,673 | A |   | 5/1990  | Barker et al. ................. 60/589 |
| 4,941,323 | A |   | 7/1990  | Monstevens ................. 60/589 |
| 5,107,680 | A |   | 4/1992  | Hojnacki et al. ............. 60/533 |
| 5,154,532 | A | * | 10/1992 | Schaefer et al. ............. 403/301 |
| 5,735,188 | A |   | 4/1998  | Nix et al. ..................... 92/129 |
| 6,095,306 | A |   | 8/2000  | Hu et al. ..................... 192/109 |
| 6,470,791 | B1 | * | 10/2002 | Welter et al. ................. 92/188 |
| 6,550,246 | B1 |   | 4/2003  | Barr et al. .................... 60/588 |
| 6,581,380 | B1 |   | 6/2003  | Dangel ........................ 60/588 |
| 6,813,991 | B1 | * | 11/2004 | Koth ............................ 92/187 |

FOREIGN PATENT DOCUMENTS

WO    WO 02/070314 A1 *  9/2002

\* cited by examiner

*Primary Examiner*—Edward K. Look
*Assistant Examiner*—Igor Kershteyn
(74) *Attorney, Agent, or Firm*—Young & Basile, P.C.

(57) ABSTRACT

A piston and cylinder assembly in which the rear end of the piston defines an arcuate concavity opening in the rear face of the piston, a retainer having an arcuate configuration matching the arcuate configuration of the piston concavity is positioned in the concavity and defines a spherical socket capturing a spherical front end of the pushrod of the assembly, and a clip coacts with a circumferential groove on the interior surface of the concavity and an external groove structure on the retainer to fixedly secure the retainer to the piston and preclude displacement of the retainer and captured pushrod from the concavity.

8 Claims, 4 Drawing Sheets

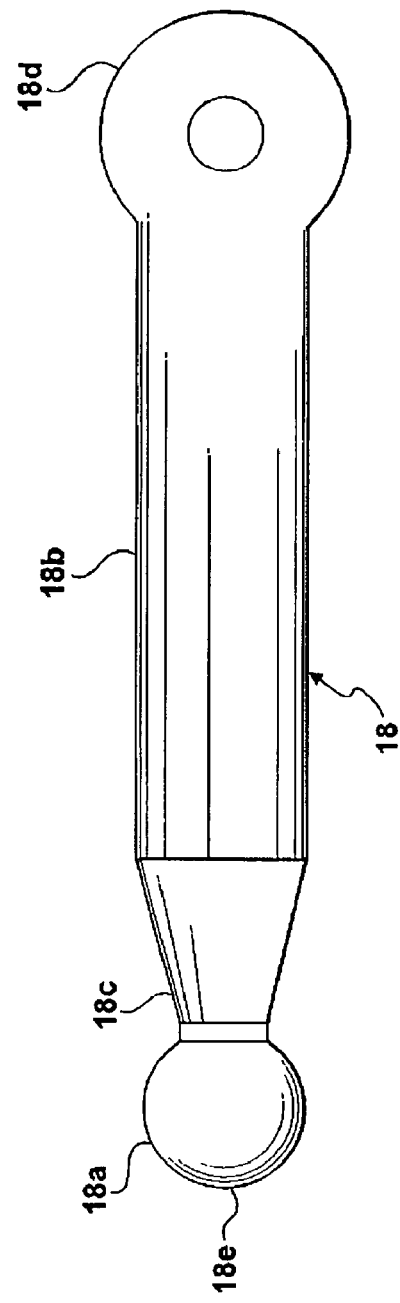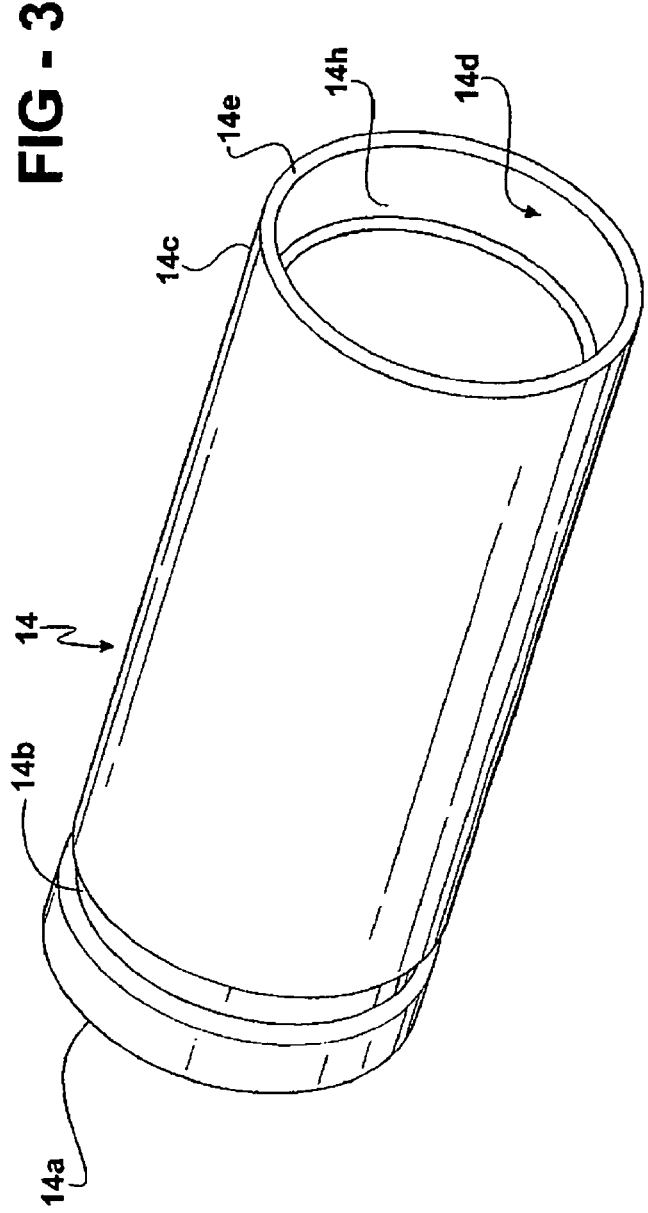

PISTON AND CYLINDER ASSEMBLY WITH PUSH ROD RETENTION

BACKGROUND OF THE INVENTION

This invention relates to a piston and cylinder assembly and more particularly to a piston and cylinder assembly of the type including a piston received in a cylinder and actuated by a pushrod.

Piston and cylinder assemblies are in common usage for a myriad of applications. In one popular type of assembly, suitable for use for example as a master cylinder in a hydraulic clutch actuation system for a motor vehicle, the piston is moved slidably in the cylinder by a pushrod extending into an open rear end of the cylinder for pushing engagement with the rear end of the piston. It is desirable that the connection between the pushrod and the piston be simple, inexpensive and reliable.

SUMMARY OF THE INVENTION

This invention is directed to the provision of an improved retention system for a pushrod of a piston and cylinder assembly.

The piston and cylinder assembly of the invention is of the type including a cylinder defining a central bore and having an open rear end; a piston slidably mounted in the bore and having a rear end defining a rearwardly opening concavity; a retainer positioned in the concavity; and a pushrod extending forwardly into the bore through the open rear end of the cylinder and having a forward, head end captured by the retainer.

According to the invention, the assembly includes a clip positioned in the concavity and fixedly engaging the retainer to preclude displacement of the retainer from the concavity. This arrangement provides a simple, inexpensive and reliable means of connecting the pushrod to the piston.

According to a further feature of the invention, aligned annular grooves are defined in the exterior of the retainer and the interior of the concavity and the clip is received in the aligned grooves. This arrangement further facilitates the simple and inexpensive construction and operation of the pushrod retention system.

According to a further feature of the invention the clip has a "C" configuration and is formed of a spring steel. This arrangement allows the utilization of a readily available hardware item to facilitate the pushrod retention.

According to a further feature of the invention, the retainer defines a generally spherical socket and the head end of the pushrod has a generally spherical configuration and is swively captured in the retainer socket. This arrangement allows the retainer to capture the pushrod whereby retention of the retainer also effectively retains the pushrod.

According to a further feature of the invention, the retainer is constituted by two retainer halves which coact to define the generally spherical socket. This arrangement facilitates the assembly of the various parts to form the pushrod retention system.

According to a further feature of the invention, each retainer half includes a rearward semicircular rim portion positioned in the rear end of the cylinder bore, a forward socket portion, and a plurality of circumferentially spaced axially extending ribs extending between the rearward rim portion and the forward socket portion and configured to fit flush in the concavity; and the clip is positioned in an annular groove in the interior of the concavity and an aligned annular groove in the retainer defined by a series of circumferentially spaced notches in the respective circumferentially spaced ribs. This arrangement further facilitates the assembly and construction of the retention arrangement.

Other applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein:

FIG. 2 is a view of a pushrod employed in the invention piston and cylinder assembly;

FIG. 3 is a perspective view of a piston utilized in the invention piston and cylinder assembly;

DETAILED DESCRIPTION OF THE PREFERRED EMBODIMENT

Figure 1:
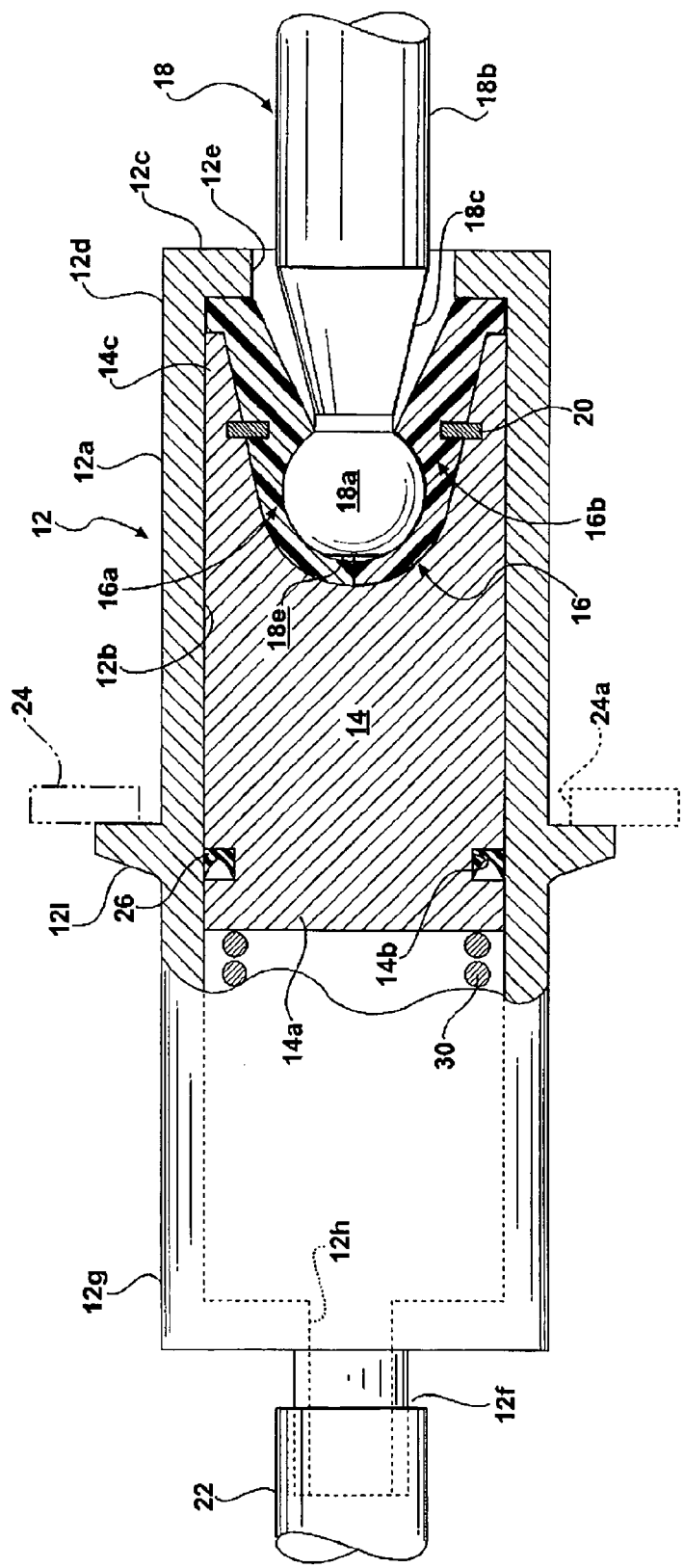
FIG. 1 is a cross-sectional view of a piston and cylinder assembly according to the invention.

The piston and cylinder assembly of the invention may comprise, for example, the master cylinder of a master/slave cylinder hydraulic clutch actuation system for a motor vehicle.

The piston and cylinder assembly 10 of the invention, broadly considered, includes a cylinder 12, a piston 14, a retainer assembly 16, a pushrod 18 and a clip 20.

Cylinder 12 (FIG. 1) includes a main body portion 12a defining a central bore 12b; an annulus 12c at the rear end 12d of the cylinder defining an opening 12e; and a fitting 12f at the front end of 12g of the cylinder defining a discharge port 12h and receiving a conduit such as a hose 22 to convey pressurized hydraulic fluid discharged from the cylinder to an associated slave cylinder (not shown). The cylinder 12 further includes an external flange 12i to facilitate attachment of the cylinder to an associated structure such as the firewall 24 of a motor vehicle with the cylinder extending through an opening 24a in the firewall.

Figure 4:
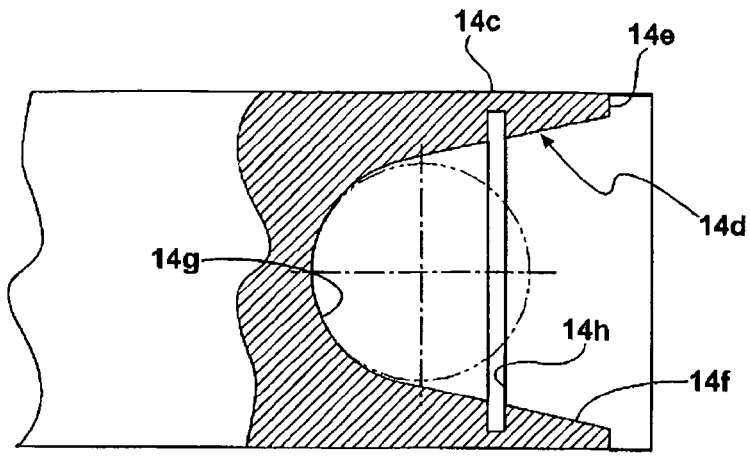
FIG. 4 is a fragmentary cross-sectional view of the piston.
Figure 5:
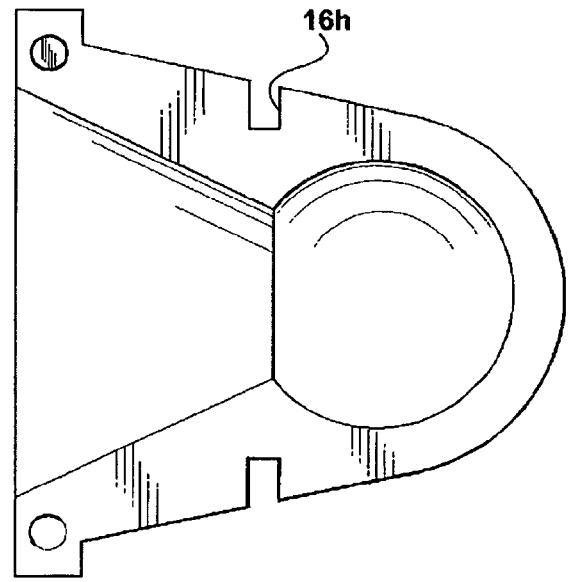
FIGS. 5, 6, 7 and 8 are detail views of a retainer assembly utilized in the invention piston and cylinder assembly.
Figure 6:
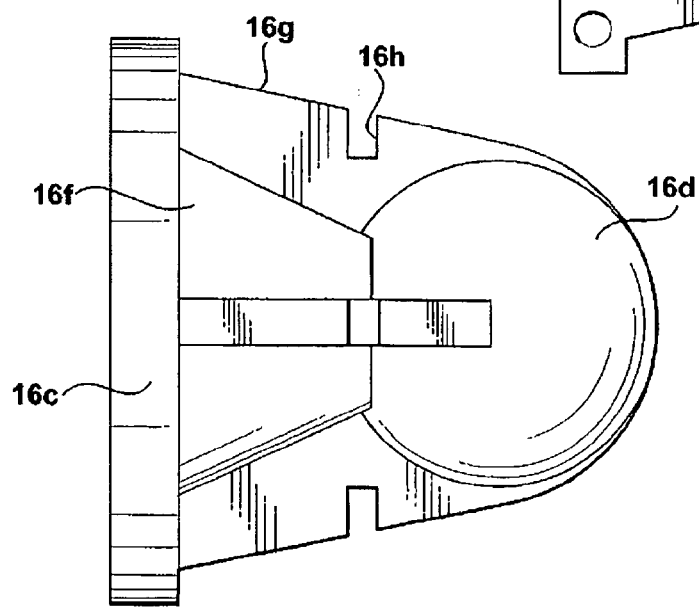
Figure 7:
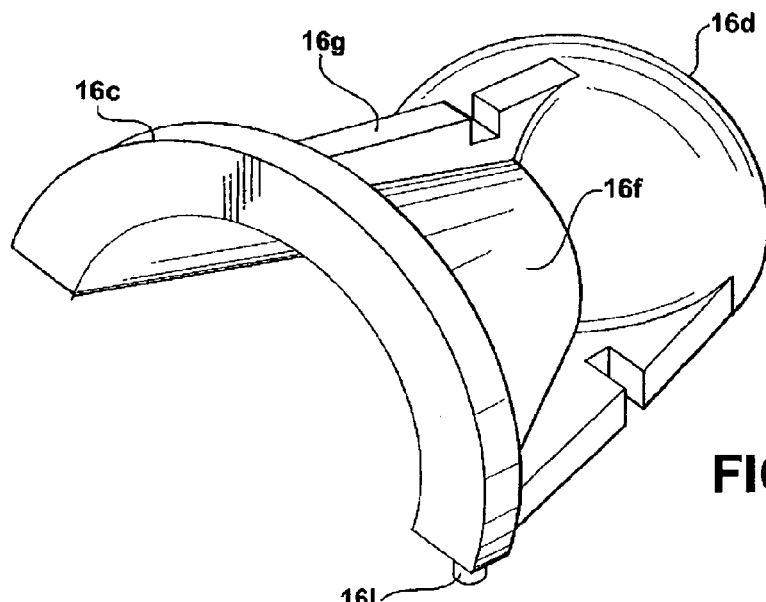
Figure 8:
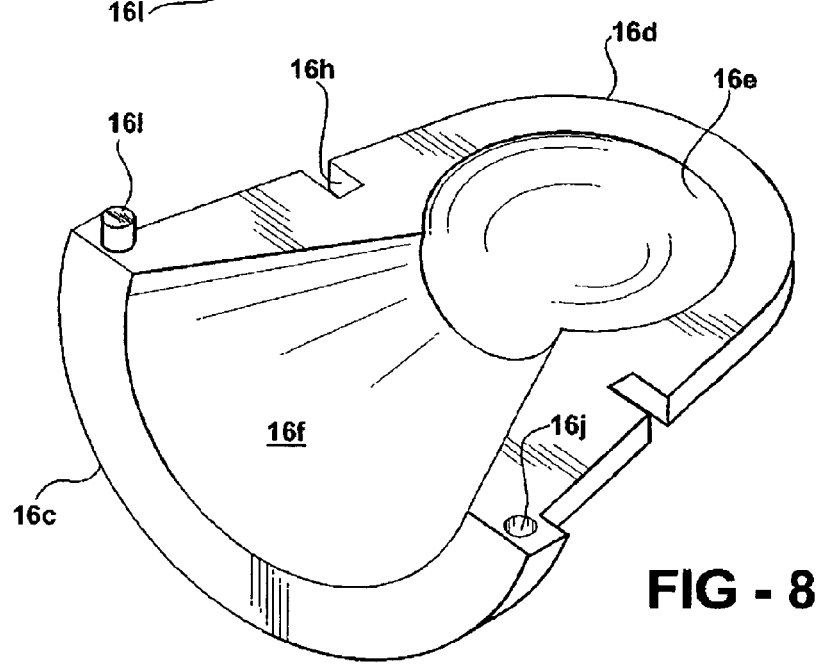

Piston 14 (FIGS. 1, 3 and 4) is sized to fit slidably in the bore 12d of the cylinder and includes a forward end 14a defining a seal groove 14b and a rear end 14c. Rear end 14c defines a concavity 14d opening in the rear end of the piston with an annular face 14e defined at the rear end of the piston in surrounding relation to the concavity 14d. Concavity 14d includes a frustro conical portion 14f and an arcuate portion 14g which blends smoothly to define a bowl shaped concavity with outwardly tapering conical sides. A circumferential groove 14h of rectangular cross-section is defined on the inner periphery of concavity 14d in frustro conical portion 14f. A annular lip seal 26 is positioned in seal groove 14b for sealing coaction, in known manner, with cylinder bore 12b.

Retainer assembly (FIGS. 1, 5, 6, 7, and 8) 16 includes two identical halves 16a and 16b which are coupled together to form the retainer assembly.

Each retainer half includes a rearward semicircular rim portion 16c, a forward and a hemispherical socket portion 16d defining a hemispherical socket 16e, a frustro conical transition portion 16f interconnecting the rim portion and the socket portion, and a plurality of circumferentially spaced, axially extending rib portions 16g extending between the rearward rim portion and the forward socket portion and configured to coact with the spherical portion 16d to define a cross-sectional profile conforming to the cross-sectional profile of concavity 14d. Each rib defines an outwardly opening notch 16h having a rectangular cross-section conforming to the cross-sectional configuration of the groove 14h in the piston concavity.

Pushrod 18 (FIGS. 1 and 2) includes a forward, head portion 18a, a main body cylindrical or rod portion 18b, a frustro conical transition portion 18c extending between head portion 18a and main body portion 18b, and a rear attachment portion 18d which may, as shown, take the form of an eye portion for connection to the clutch pedal of a motor vehicle in applications in which the invention piston and cylinder assembly forms the master cylinder of a master cylinder/slave cylinder hydraulic clutch actuation system for a motor vehicle. Head end 18a has a spherical configuration conforming generally to the spherical configuration of the socket surfaces 16e of the retainer halves so that with the retainer halves positioned over the pushrod end a swivel connection is formed. A flat 18e is provided on the forward end of head 18a.

Figure 9:
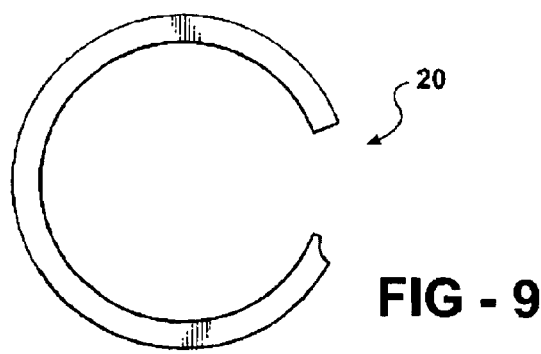
FIG. 9 is a view of a clip utilized in the invention piston and cylinder assembly.

Clip 20 (FIGS. 1 and 9) is of the type commercially identified as a "C" clip, has a "C" configuration, is formed of a spring steel, and has a rectangular cross-sectional configuration generally conforming to the cross-sectional configuration of the groove 14h and the notches 16h.

ASSEMBLY

To assemble the piston and cylinder assembly of the invention, the socket portions of the retainer halves are positioned over the spherical pushrod head 18a with locating pins 16i and sockets 16j on the retainer halves coacting to align the retainer halves and couple the retainer halves together with the pushrod head captured by the hemispherical portions of the retainer halves to form a swivel connection; clip 20 is positioned in groove 14g; the retainer halves with the captured pushrod are pushed into the concavity 14d to force the outer periphery of the "C" clip to expand radially outwardly into the groove 14g and force the inner periphery of the "C" clip to snap into the notches 16h; a suitable return spring 30 is positioned in bore 12b; a suitable seal 26 is positioned in groove 14b; and the piston/retainer/pushrod assembly is positioned in bore 12b with the rim portions 16c of the retainers positioned against cylinder annulus 12c and the piston slidably and sealingly received in the bore.

Note that the piston/retainer/pushrod assembly can be positioned in the cylinder bore either by forming the cylinder with an open rear end for rear end insertion of the piston/retainer/pushrod assembly and thereafter forming annulus 12c in a peening operation, or by forming the cylinder as a two-part structure and positioning the piston/retainer/pushrod assembly in the rear piston structure before coupling the rear piston structure to the front piston structure. Note further that the notches 16h effectively coact to define an annular groove structure on the exterior of the retainer assembly for alignment and coaction with groove 14h to capture the "C" ring and fixedly secure the retainer in the concavity 14d to preclude displacement of the retainer from the concavity.

The invention will be seen to provide a connection between the pushrod and the piston that is simple, inexpensive and reliable.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A piston and cylinder assembly comprising:
   a cylinder defining a central bore and having an open rear end;
   a piston slidably mounted in the bore and having a rear end defining a rearwardly opening concavity;
   a retainer positioned in the concavity;
   a pushrod extending forwardly into the bore through the open rear end of the cylinder and having a forward, head end captured by the retainer;
   a clip positioned in the concavity and fixedly engaging the retainer to preclude displacement of the retainer from the concavity;
   the retainer including a rearward circular rim portion positioned in the rear end of the bore, a forward socket portion capturing the head end of the pushrod, and a plurality of circumferentially spaced axially extending ribs extending between the rearward rim portion and the forward socket portion and configured to fit flush in the concavity, the clip being positioned in an annular groove in the interior of the concavity and in an aligned annular groove in the retainer defined by a series of circumferentially spaced notches in the respective circumferentially spaced ribs.

2. A piston and cylinder assembly comprising a cylinder defining a central bore and having an open rear end, a piston slidably mounted in the bore and having a rear end defining a rearwardly opening concavity, a retainer positioned in the concavity, and a pushrod extending forwardly into the bore through the open rear end of the cylinder and having a forward, head end captured by the retainer, characterized in that:
   the retainer includes a forward portion having an arcuate cross-sectional configuration conforming to the cross-sectional configuration of a forward portion of the concavity and defining a generally spherical rearwardly opening socket;
   the head end of the pushrod has a generally spherical configuration and is swively received in the retainer socket; and
   the assembly further includes an annular clip positioned in the concavity encircling and fixedly engaging the retainer and fixedly engaging the concavity to preclude displacement of the retainer from the concavity.

3. A piston and cylinder assembly according to claim 2 wherein:
   aligned annular grooves are defined in the exterior of the retainer and the interior of the concavity; and
   the clip is received in the aligned grooves.

4. A piston and cylinder assembly according to claim 3 wherein the clip has a "C" configuration and is formed of a spring steel.

5. A piston and cylinder assembly according to claim 2 wherein the retainer is constituted by two retainer halves which coact to define the generally spherical socket.

6. A piston and cylinder assembly according to claim 2 wherein the concavity and the retainer, overall, have conforming, generally arcuate cross-sectional profiles whereby the entire retainer fits flush within the concavity.

7. A piston and cylinder assembly comprising a cylinder defining and a central bore and having an open rear end, a piston slidably mounted in the bore and having a rear end defining a rearwardly opening concavity, a retainer positioned in the concavity, and a pushrod extending forwardly into the bore through the open rear end of the cylinder and having a forward, head end captured by the retainer, characterized in that:
- the retainer defines a generally spherical socket;
- the head end of the pushrod has a generally spherical configuration and is swively received in the retainer socket; and
- the assembly further includes a clip positioned in the concavity and fixedly engaging the retainer to preclude displacement of the retainer from the concavity;
- the retainer being constituted by two retainer halves which coact to define that generally spherical socket;
- each retainer half including as rearward semicircular rim portion positioned in the rear end of the bore, a forward socket portion, and a plurality of circumferentially spaced axially extending ribs extending between the rearward rim portion and the forward socket portion and configured to fit flush in the concavity;
- the clip being positioned in an annular groove in the interior of the concavity and an aligned annular groove in the retainer defined by a series of circumferentially spaced notches in the respective circumferentially spaced ribs.

8. A piston and cylinder assembly comprising:
- a cylinder defining a central bore and having an open rear end;
- a piston slidably mounted in the bore and having a rear end defining a rearwardly opening concavity;
- a retainer positioned in the concavity;
- a pushrod extending forwardly into the bore through the open rear end of the cylinder and having a forward, head end captured by the retainer; and
- a clip positioned in the concavity and fixedly engaging the retainer to preclude displacement of the retainer from the concavity;
- the concavity including a forward portion having an arcuate cross-sectional configuration;
- the retainer including a forward portion having an arcuate cross-sectional configuration conforming to the cross-sectional configuration of the forward concavity portion;
- the concavity including a rearward frustro conical portion blending with the arcuate forward portion to define a rearwardly opening bowl shaped configuration.

* * * * *